Aug. 2, 1966   J. FILLIOL   3,263,671

SPACE HEATER

Filed April 22, 1965

INVENTOR.
JACQUES FILLIOL
BY
ATTORNEY

United States Patent Office 3,263,671
Patented August 2, 1966

3,263,671
SPACE HEATER
Jacques Filliol, Rte. 2, Box 60, Zillah, Wash.
Filed Apr. 22, 1965, Ser. No. 450,053
5 Claims. (Cl. 126—59.5)

This invention is concerned with space heater and, more particularly, with a radiant space heater useful to orchardists and others who are concerned with supplying heat without unduly contaminating the air with the products of combustion.

This invention shall be described as being employed by orchardists or other agriculturists. It will, of course, be understood that such an application of the invention is intended for illustrative purposes and not limitatively. The space heater described herein will be useful by builders to dry out closed in but otherwise incomplete structures such as buildings and the like, to dry plaster or wall coatings and probably for campers, sportsmen, and outdoorsmen for heating purposes.

Among the more important objects of this invention have been the provision of a structure comprising several elements which when assembled furnishes a heater very well adapted for use with solid, preferably non-smoking, fuels, which is simple and easy to construct in order that the initial cost may be kept to a minimum, and which can be quickly and easily adjusted to increase or decrease the flow of air to the fuel thus to vary the rate of combustion and the output of heat.

The foregoing and other objects of this invention will be readily apparent during the course of the following description in which is set forth the preferred form of the invention. During the course of this specification allusion will be had to the accompanying drawings in which.

In general, this invention comprises a fire pot to contain fuel in its bottom and having an upwardly open mouth. The pot is imperforate and is provided with no other air opening or inlet except through the mouth. Such a pot may be in the form of a bucket either cylindrical or tapered, preferably the former. Practical experience has taught that a five or seven gallon pail is very suitable, typical pot being approximately 13 inches high and about 11¼ inches in diameter internally.

An open-ended tubular stack having a lateral cross-section smaller than the mouth of the pot is disposed substantially coaxially in the pot. This stack is vertically adjustable with relation to the pot and particularly with relation to fuel contained in the pot to vary the draft effect of air inflowing over the lips of the pot mouth and downward around the exterior of the stack. Typically such a stack would be 12 inches high and ten inches in diameter.

Inwardly biased flexible means, which may broadly be described as plates, are disposed within the pot exterior of the stack. By arranging that the plates bear on their edges on the interior surface of the pot and medially against the exterior surface of the stack the latter may be slidably movable in various vertical dispositions in order to obtain the adjustment mentioned. In the preferred form, it is desirable that the flexible means be inwardly biased so that fairly substantial frictional engagement is obtained between the surface of these means and the stack against which they bear.

Figure 1:
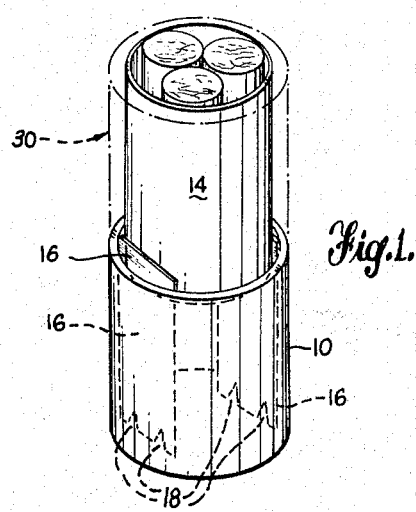
FIGURE 1 is a perspective view of a space heater according to this invention, with portions shown in broken lines to indicate interior structure.

More specifically and with reference to the drawings, a cylindrical pot 10 having a bottom 12 and formed of metal receives at its axis the tubular stack 14. The mouth 11 of fire pot 10 is larger than the lateral cross-section of the stack 14 as shown in FIGURE 1 where the elements 10 and 14 are cylinders. It will, of course, be obvious to those skilled in the art that other shapes will function equally as well and it is thereby intended in this patent not to be limited solely to the cylindrical shape.

Within firepot 10, in FIGURE 1, may be seen a pair of plates 16, 16 which are rectangular, generally of a height less than the depth of the pot 10, and which rest upon the bottom 12 of the firepot. Typical plates will have dimensions of about 12 inches in height and six inches wide. Plates 16 are shown in this instance as having a notch or notches 18 at their bottom edges which serve as air passages at the lower edge of plate 16 to facilitate the ingress of air from the outer surface of plate 16 when the plates rest on pot bottom 12.

Figure 5:
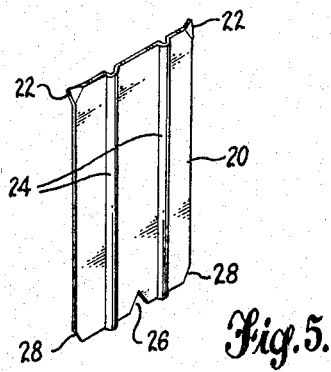
FIGURE 5 is a perspective view of a typical resilient plate.

In FIGURE 5 is shown a modified form of resilient plate 20 which likewise is generally rectangular in face view. Plate 20 has outwardly bent corners 22, 22 at the upper edge, intermediate concavo-convex ribs 24 running between the top and bottom edges, air passages notch 26 at the bottom edge, and nipped off or cut off corners 28. When the plate 20 is in position in the firepot 10 the passage of air from outside of the plate to the fuel generally located at the center of pot bottom 12 is thus insured.

Figure 3:
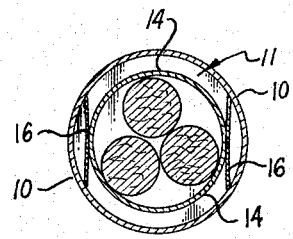
FIGURE 3 is a cross-sectional view taken on line 3—3 of FIGURE 2 showing resilient plates that are employed in a heater to support its stack.
Figure 6:
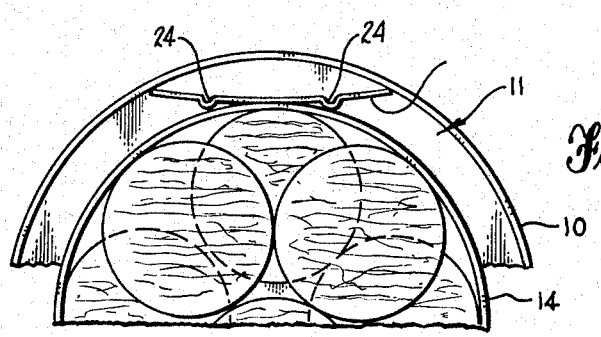
FIGURE 6 is an enlarged plan view of a portion of the space heater.

It is preferable that either plate 16 or plate 20 be biased to impart inward pressure agaist the stack 14. This is indicated by the arcuate configuration shown in FIGURES 3 and 4. Plate 20 is placed in the pot 10 so that ribs 24 are disposed inward. When the stack 14 is placed between the upper edge of the plate it is cradled by the ribs as shown in FIGURE 6. Normally the open-ended stack 14 is pressed slightly out of round and, when released, expands to apply pressure against the plates 16 or 20 to maintain an adjusted position. Practice has taught that stack 14 operates suitably when inserted downward about one inch beneath the upper edges of the plates.

Figure 2:
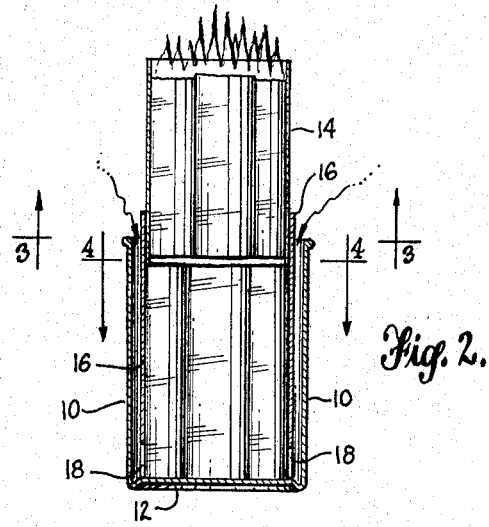
FIGURE 2 is a vertical sectional view of the space heater of FIGURE 1.

When the elements described have been assembled and are viewed from above the structure will appear as in FIGURE 2. The plates 16, or in the case of plates 20 being substituted therefor, will be generally disposed in a chordal relationship to the inner wall of pot 10. The diameter of the stack will be such that it tends to flex the plates bearing against it or to be flexed by them depending upon the relative strength of the materials used. While a single pair of plates have been employed it will be readily apparent that three or four or more plates likewise may be used.

In use, an orchardist will place a series of fire pots throughout his orchard as circumstances require. He charges the pots with a quantity of slow burning semi-solid or solid fuel of which compressed saw dust briquettes or compressed saw dust logs or the like are typical.

Figure 4:
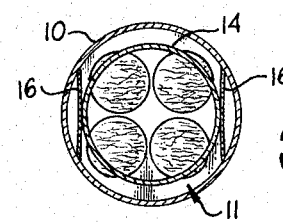
FIGURE 4 is a cross-sectional view taken on line 4—4 of FIGURE 2 showing the manner in which the plates confine the fuel and define air inlet passages.

Very satisfactory fuel logs are produced by the Weyerhaeuser Company, Pres-to-Log Department, Tacoma, Washington 98401. They are sold under the trademark "Pres-to-Log" and are formed of clean, dry planer mill shavings and other wood waste compressed into a log having a density about three times that of wood. They usually are about 12 inches long and four inches in diameter. As shown in FIGURE 4, four such logs are placed on end between a pair of plates 16 in a square pattern in the bottom of pot 10. They thus initially tend to hold plates 16 in place. Then stack 14 is inserted as described and when desired three more fuel logs may be placed therein, see FIGURE 3. A starter of oiled sawdust, crimped and oiled paper and the like is also placed in the pot between and adjacent the bottom logs. This is ignited and, in due course, ignites the fuel logs. While, such logs are highly effective and useful, it will be apparent that other solid or semi-solid fuels may also be used. Air enters the fire chamber between plates 16 or 20 and the adjacent pot wall and, as well, through the interstices between the fuel.

It has been found that heaters according to this invention appear to initially burn-in or break in with the first burning. There may be a slight smudge due to the ignition oil used but this quickly dissipates and can be controlled to within permissible limits. Once a pot is burned in, ignition thereafter is no problem. Remaining charcoal readily ignites and fuel oil is seldom required. As ash accumulates it is preferably dumped by upending the assembly which thereafter may be recharged with fuel logs as described.

In general, the more the stack 14 is lowered into the firepot the slower will be combustion and conversely with the stack in a more elevated position the more rapid combustion will occur. Combustion may be terminated by up-ending a matching container 30, see FIGURE 1 which cuts off air ingress to the fuel. When the oxygen is consumed the fire dies out and the fuel in charred form remains to be reignited and used again. The containers 10 and 30 may be secured in the FIGURE 1 relationship by use of crocodile or similar chips gripping their opposed beaded edges, or the plates 16 may be raised as in FIGURE 2 so that the two containers are somewhat connected.

By nipping off the corners of the plates at 28 in FIGURE 5, and the same may be done to plate 16, insertion of the plate is facilitated because this eliminates what otherwise might be sharp corners that would tend to hang up on the inner wall of the pot 10. The outwardly turned points 22 at the upper corners of the plate 20 to engage the inner surface of the firepot wall and to resist dislodgement as when the stack 14 is being vertically adjusted in an upward or outward direction. It has been found that by providing the ribs 24 in the manner shown, plate 20 will practically automatically assume the arcuate configuration suggested in FIGURE 6. Of course, the plate from side to side may likewise be slightly curved through a forming operation. The guide ribs 24 obviously function to strengthen the plate as well as to impart shape to them.

To facilitate further comprehension of this invention it has been found extremely practical to form the stack 14 of 24 gauge black iron in the form of a hollow cylinder having an internal cross-sectional diameter of about 9¾ inches and a length of approximately 12 inches. Desirably the plates either 16 or 20 should be formed of 20 gauge black iron and be about 5¼ to 6 inches wide and ten to twelve inches in height. When ribs 24 are included they should be symmetrically arranged along the length of the plate to outstand on the inward or stack-bearing surface of the plate.

As was pointed out above it will be apparent to those skilled in the art that this space heater may be formed of shapes other than cylindrical or plate like. For example, the firepot may be a right rectangular container in which case the plates either 16 or 20 may be angularly disposed across opposite corners of the container in order to obtain the desired bearing. Also it would be readily apparent that the stack need not necessarily be cylindrical since its function is primarily as to its interior to carry off combustion gasses and as to its exterior to, in cooperation with the mouth 11 of the firepot, form an air inlet.

Whenever it is desirable that heat be radiated from a single side of the heater, a single plate may be used in which case the fuel will be lodged closely against the opposite side of the container. As burning takes place ash and charcoal accumulate in a moraine-like slope against the side and bottom of the firepot away from the single plate.

It should be specifically understood with a space heater of the nature described herein, it is undesirable to permit air to enter the combustion area through holes in the outside as otherwise the draft control feature of this space heater would be either less effective or nullified.

What is claimed is:
1. A solid fuel space heater, comprising:
    an imperforate cylindrical firepot having an upwardly open mouth only through which air to fuel in the pot is accessible;
    an open-ended tubular stack laterally smaller than the pot mouth and substantially coaxially disposed in said pot; and
    at least two resilient plates chordally disposed in edge contact with said pot inner wall and having surface contact with the exterior of said stack to frictionally engage and maintain the same in vertically adjusted position relative the pot.

2. The structure according to claim 1 in which the stack is a hollow cylinder.

3. The structure according to claim 1 in which the plates rise from the pot bottom and include air passages therethrough, located to pass air at a lower position in said fire pot from their outer sides inward.

4. A solid fuel space heater, comprising:
    a firepot having an upwardly open mouth, to contain fuel, to which air is accessible primarily only by passing through said upwardly open mouth;
    an open-ended tubular stack laterally smaller than the mouth of the pot substantially coaxially disposed in said pot; and
    inwardly biased flexible means in said pot resiliently bearing on the exterior of said stack to frictionally engage and maintain the same in vertically adjusted position relative the pot.

5. The structure according to claim 4 in which the stack is a hollow cylinder.

References Cited by the Examiner
UNITED STATES PATENTS

| | | | |
|---|---|---|---|
| 944,745 | 12/1909 | Plank et al. | |
| 1,010,461 | 12/1911 | Smith | 158—91 |
| 1,232,276 | 7/1917 | Gillett | 126—59.5 |
| 1,446,353 | 2/1923 | Slocum | 158—97 |
| 1,648,041 | 11/1927 | Button | 158—91 |
| 2,500,658 | 3/1950 | Breese et al. | 126—43 |

CHARLES J. MYHRE, *Primary Examiner.*